US012327936B2

(12) United States Patent
Chen et al.

(10) Patent No.: US 12,327,936 B2
(45) Date of Patent: Jun. 10, 2025

(54) LIGHT-TRANSMITTING ANTENNA

(71) Applicant: Industrial Technology Research Institute, Hsinchu (TW)

(72) Inventors: Meng-Hsuan Chen, Taichung (TW); Cheng-Hua Tsai, New Taipei (TW); Mei-Ju Lee, Hsinchu (TW); Ruo-Lan Chang, New Taipei (TW); Wei-Chung Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 189 days.

(21) Appl. No.: 18/086,672

(22) Filed: Dec. 22, 2022

(65) Prior Publication Data

US 2024/0120656 A1 Apr. 11, 2024

(30) Foreign Application Priority Data

Oct. 7, 2022 (TW) ................................ 111138298

(51) Int. Cl.
*H01Q 1/12* (2006.01)
*H01Q 9/04* (2006.01)
*H01Q 19/10* (2006.01)

(52) U.S. Cl.
CPC ........... *H01Q 9/045* (2013.01); *H01Q 1/1271* (2013.01); *H01Q 19/10* (2013.01)

(58) Field of Classification Search
CPC ...... H01Q 9/045; H01Q 1/1271; H01Q 19/10; H01Q 1/364; H01Q 9/285; H01Q 1/38; H01Q 1/50; H01Q 5/307
See application file for complete search history.

(56) References Cited

U.S. PATENT DOCUMENTS 7,050,013 B2 5/2006 Kim et al.
9,755,299 B2 9/2017 Lee et al.
(Continued)

FOREIGN PATENT DOCUMENTS

CN 101180765 6/2013
CN 104241832 12/2014
(Continued)

OTHER PUBLICATIONS

CN111342222A_Machine_Translation (Year: 2020).*
(Continued)

*Primary Examiner* — Hai V Tran
*Assistant Examiner* — Michael M Bouizza
(74) *Attorney, Agent, or Firm* — JCIPRNET

(57) ABSTRACT

A light-transmitting antenna includes a substrate, a first conductive pattern, and a second conductive pattern. The first conductive pattern has a first feeder unit, a first radiation unit, a second radiation unit, and a first connection unit. The first feeder unit and the first connection unit are connected to two sides of the first radiation unit. The first connection unit connects the first radiation unit and the second radiation unit. The second conductive pattern has a second feeder unit, a third radiation unit, a fourth radiation unit, and a second connection unit. The second feeder unit and the second connection unit are connected to two sides of the third radiation unit. The second connection unit connects the third radiation unit and the fourth radiation unit. An orthogonal projection of the second feeder unit on a first surface of the substrate at least partially overlaps the first feeder unit.

13 Claims, 4 Drawing Sheets

(56) References Cited

U.S. PATENT DOCUMENTS

| | | | | |
|---|---|---|---|---|
| 9,761,934 | B2 | 9/2017 | Puente Baliarda et al. | |
| 2003/0034917 | A1 | 2/2003 | Nishizawa et al. | |
| 2009/0051620 | A1 * | 2/2009 | Ishibashi | H01Q 9/16 343/897 |
| 2011/0063190 | A1 | 3/2011 | Ho et al. | |
| 2014/0139379 | A1 * | 5/2014 | Bolin | H01Q 9/06 343/702 |
| 2015/0295325 | A1 | 10/2015 | Hsu et al. | |
| 2017/0194699 | A1 | 7/2017 | Ouedraogo et al. | |
| 2017/0317421 | A1 | 11/2017 | Grando et al. | |
| 2021/0280973 | A1 | 9/2021 | Chan et al. | |
| 2022/0276682 | A1 * | 9/2022 | Yu | H01Q 21/28 |
| 2022/0410605 | A1 * | 12/2022 | Yang | H01Q 9/0407 |

FOREIGN PATENT DOCUMENTS

| | | |
|---|---|---|
| CN | 104466352 | 3/2015 |
| CN | 105742785 | 7/2016 |
| CN | 205406716 | 7/2016 |
| CN | 102882004 | 8/2016 |
| CN | 103825086 | 8/2016 |
| CN | 111342222 | 6/2020 |
| EP | 1515396 | 3/2005 |
| TW | 201622249 | 6/2016 |
| TW | 201740609 | 11/2017 |

OTHER PUBLICATIONS

"Office Action of Taiwan Counterpart Application", issued on Aug. 14, 2023, p. 1-p. 6.

Guangwei Yang et al., "A Multi-Band Magneto-Electric Dipole Antenna with Wide Beam-width," IEEE Access, vol. 8, Apr. 2020, pp. 68820-68827.

Lei Chang et al., "A Compact Wideband Dipole Antenna With Wide Beamwidth," IEEE Antennas and Wireless Propagation Letters, vol. 20, Sep. 2021, pp. 1701-1705.

Guiping Zheng et al., "A broad band printed bow-tie antenna with a simplified feed," IEEE Antennas and Propagation Society Symposium, Jun. 2004, pp. 4024-4027.

Guangwei Yang et al., "Broadening the Beam-Width of Microstrip Antenna by the Induced Vertical Currents," IET Microwaves Antennas & Propagation, vol. 12, Oct. 2017, pp. 190-194.

Hang Wong et al., "Wideband Shorted Bowtie Patch Antenna With Electric Dipole," IEEE Transactions on Antennas and Propagation, vol. 56, Jul. 2008, pp. 2098-2101.

* cited by examiner

LIGHT-TRANSMITTING ANTENNA

CROSS-REFERENCE TO RELATED APPLICATION

This application claims the priority benefit of Taiwan application serial no. 111138298, filed on Oct. 7, 2022. The entirety of the above-mentioned patent application is hereby incorporated by reference herein and made a part of this specification.

BACKGROUND

Technical Field

The disclosure relates to an antenna, and in particular, relates to a light-transmitting antenna.

Description of Related Art

At present, in the wireless communication technology, the relay technology is gradually adopted to improve wireless communication coverage, group mobility, cell-edge throughput of base stations, as well as to provide temporary network deployment methods. In the 5G communication system, in order to improve the coverage of signals, the base station is best placed on the middle floor of the building, rather than on the top of the building far from the ground. However, the complex urban environment makes it difficult to find a place to install the antenna. As such, if the antenna can be installed on the indoor window to provide improved coverage through the glass and the light-transmitting antenna adopts a light-transmitting and inconspicuous design that combines aesthetics and function, the troubles of selection of a large number of sites and site installation may be eliminated. Certainly, the performance of the light-transmitting antenna also affects the user experience of the wireless network users. On the other hand, in order to provide communication services to users in a specific area (such as indoors), the wider the radio wave coverage, the better. Regarding the antenna, the antenna also needs to be able to provide wide-angle radiation. Although common monopole or dipole antenna products can achieve a wide radiation angle, even close to omnidirectional, most of these antennas are not light-transmitting antennas, and the antenna gain is not high.

SUMMARY

The disclosure provides a light-transmitting antenna providing improved performance.

The disclosure provides a light-transmitting antenna including a substrate, a first conductive pattern, and a second conductive pattern. The substrate has a first surface and a second surface opposite to each other. The first conductive pattern is disposed on the first surface and has a first feeder unit, a first radiation unit, a second radiation unit, and a first connection unit. The first feeder unit and the first connection unit are connected to two opposite sides of the first radiation unit. Two ends of the first connection unit connect the first radiation unit and the second radiation unit. A second conductive pattern is disposed on the second surface and has a second feeder unit, a third radiation unit, a fourth radiation unit, and a second connection unit. The second feeder unit and the second connection unit are connected to two opposite sides of the third radiation unit. Two ends of the second connection unit connect the third radiation unit and the fourth radiation unit. An orthogonal projection of the second feeder unit on the first surface at least partially overlaps the first feeder unit.

To sum up, the light-transmitting antenna of the disclosure has the characteristics of wide beam, high gain, and multiple frequencies.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
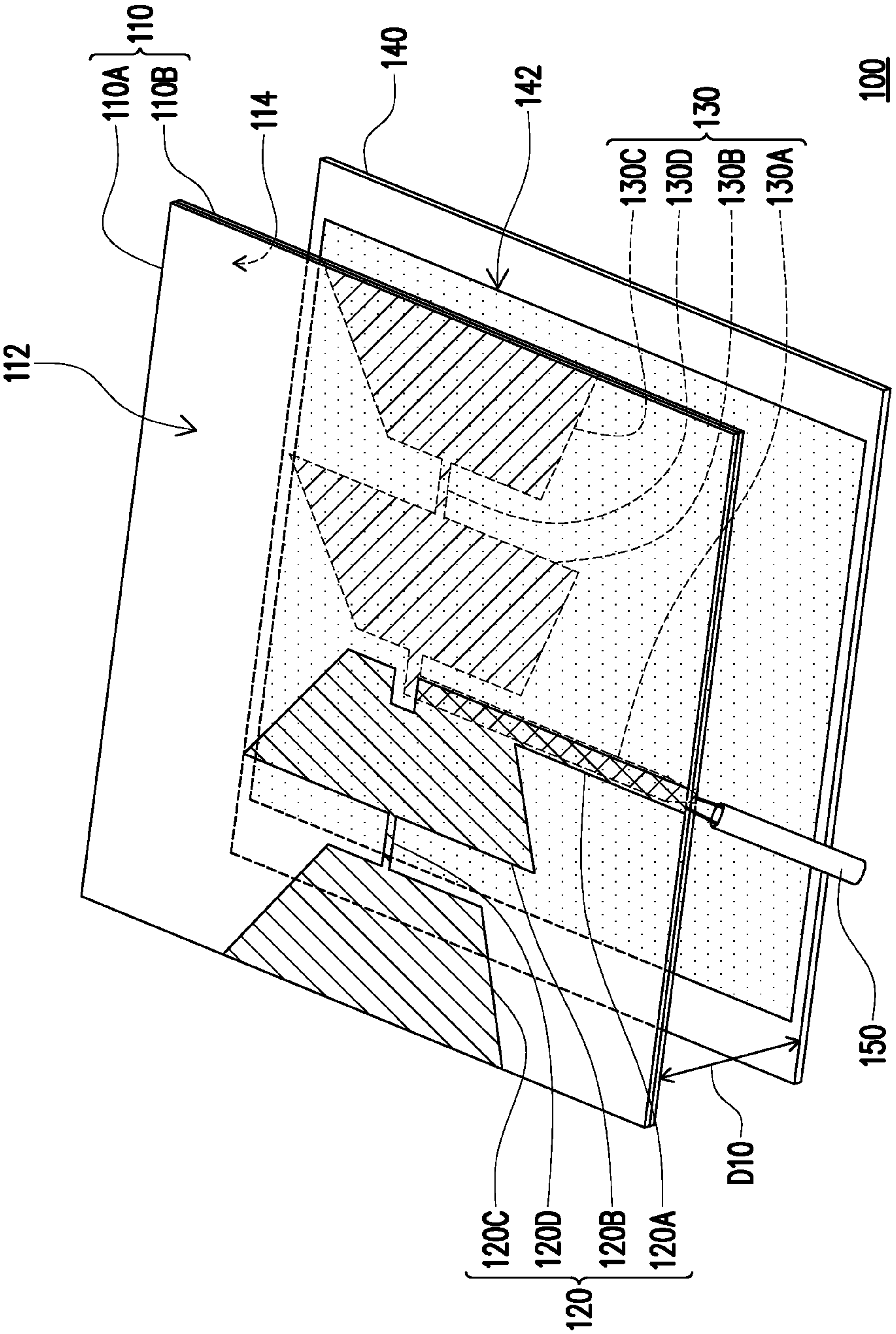
FIG. 1 is a schematic three-dimensional view of a light-transmitting antenna according to an embodiment of the disclosure.

FIG. 1 is a schematic three-dimensional view of a light-transmitting antenna according to an embodiment of the disclosure. With reference to FIG. 1, in this embodiment, a light-transmitting antenna 100 includes a substrate 110, a first conductive pattern 120, and a second conductive pattern 130. The substrate 110 has a first surface 112 and a second surface 114 opposite to each other. The first conductive pattern 120 is disposed on the first surface 112 and has a first feeder unit 120A, a first radiation unit 120B, a second radiation unit 120C, and a first connection unit 120D. The first feeder unit 120A and the first connection unit 120D are connected to two opposite sides of the first radiation unit 120B. Two ends of the first connection unit 120D connect the first radiation unit 120B and the second radiation unit 120C. The second conductive pattern 130 is disposed on the second surface 114 and has a second feeder unit 130A, a third radiation unit 130B, a fourth radiation unit 130C, and a second connection unit 130D. The second feeder unit 130A and the second connection unit 130D are connected to two opposite sides of the third radiation unit 130B. Two ends of the second connection unit 130D connect the third radiation unit 130B and the fourth radiation unit 130C. An orthogonal projection of the second feeder unit 130A on the first surface 112 at least partially overlaps the first feeder unit 120A.

In the light-transmitting antenna 100 of this embodiment, the first feeder unit 120A of the first conductive pattern 120 and the second feeder unit 130A of the second conductive pattern 130 are coupled to each other, so that a signal can be fed in by capacitive feeding. Besides, both the first conductive pattern 120 and the second conductive pattern 130 have high light transmittance and are suitable for being installed indoors to improve network coverage. Even if the antenna is installed outdoors and is pulled into the room with a long cable, the cable may not experience signal loss, the daylighting in the room is not affected, and aesthetics is kept. Further, the light-transmitting antenna 100 of this embodiment has the characteristics such as full-plane current, multi-frequency, wide beam, and high gain.

In this embodiment, the substrate 110 has no conductive through holes. That is, the light-transmitting antenna 100 does not need conductive through holes that may shield light. Instead, the first feeder unit 120A and the second feeder unit 130A are used to pull the position where the signal is fed to an edge of the substrate 110. In this way, opaque spots are not generated in the central region of the light-transmitting antenna 100, sightlines are not affected, and aesthetics is kept. In this embodiment, the light-transmitting antenna 100 may further include a feeder line 150. The first feeder unit 120A and the second feeder unit 130A are electrically connected to the feeder line 150 at the edge of the substrate 110.

In this embodiment, the substrate 110 includes a first substrate 110A and a second substrate 110B that are stacked on each other. A surface of the first substrate 110A facing away from the second substrate 110B is the first surface 112. A surface of the second substrate 110B facing away from the first substrate 110A is the second surface 114. The first substrate 110A and the second substrate 110B are stacked on each other, for example, in direct contact with each other without substantially any gap. Under this structure, the first conductive pattern 120 can be formed on the first substrate 110A by a single-sided process, the second conductive pattern 130 can also be formed on the second substrate 110B by a single-sided process, and the overall process costs are low and the yield is high.

In this embodiment, the light-transmitting antenna 100 further includes a conductive reflecting plate 140 stacked on the substrate 110 at a distance. That is, the conductive reflecting plate 140 is stacked on the substrate 110 with a distance therebetween. The arrangement of the conductive reflecting plate 140 provides the functions of electromagnetic wave reflection and shielding, so that the directivity of the antenna is improved, and environmental influences are also isolated. In this embodiment, the light-transmitting antenna 100 has an operating wavelength (relative to the dielectric constant of air or to the dielectric constant of the substrate material). A distance D10 between the conductive reflecting plate 140 and the substrate 110 is between 0.05 times to 1.5 times the operating wavelength, for example. For instance, the distance D10 between the conductive reflecting plate 140 and the substrate 110 may be 3 cm.

Figure 2:
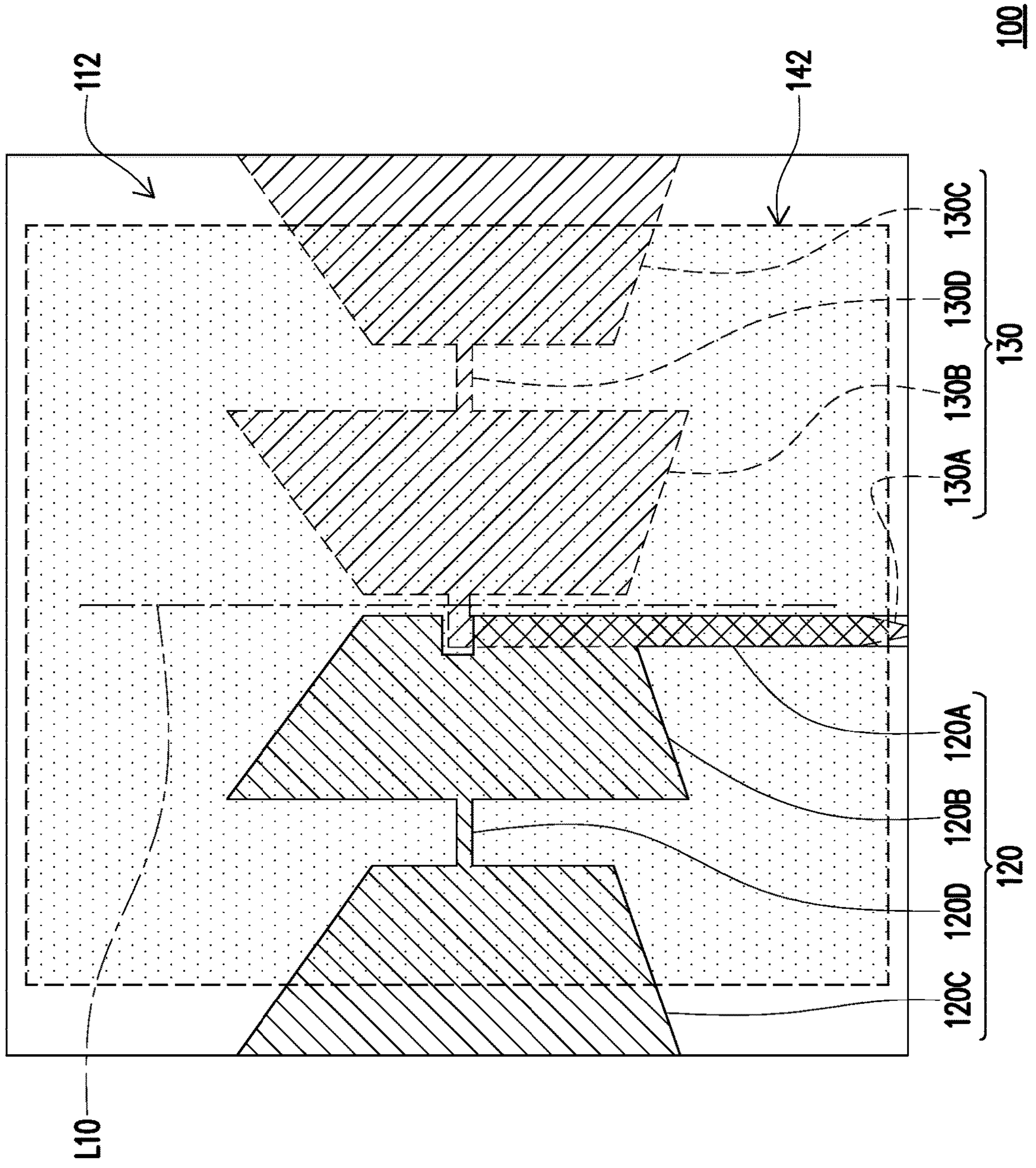
FIG. 2 is a front view of the light-transmitting antenna of FIG. 1.

FIG. 2 is a front view of the light-transmitting antenna of FIG. 1. With reference to FIG. 2, in this embodiment, the conductive reflecting plate 141 has a conductive zone 142. Orthogonal projections of the first radiation unit 120B, the first connection unit 120D, the third radiation unit 130B, and the second connection unit 130D on the conductive reflecting plate 140 all fall on the conductive zone 142. Orthogonal projections of the second radiation unit 120C and the fourth radiation unit 130C on the conductive reflecting plate 140 partially fall on the conductive zone 142. In this way, the range of electromagnetic wave radiation may be expanded, that is, the beam width increase, and a wider communication is achieved.

In this embodiment, the first radiation unit 120B, the second radiation unit 120C, the third radiation unit 130B, and the fourth radiation unit 130C are trapezoidal. In this embodiment, the two base angles of the trapezoid of each of the radiation units are not equal, but the disclosure is not limited thereto.

In this embodiment, the orthogonal projections of the first radiation unit 120B and the third radiation unit 130B on the first surface 112 are located between the orthogonal projections of the second radiation unit 120C and the fourth radiation unit 130C on the first surface 112. The first radiation unit 120B is located between the orthogonal projections of the second radiation unit 120C and the third radiation unit 130B on the first surface 112. The orthogonal projection of the third radiation unit 130B on the first surface 112 is located between the orthogonal projections of the first radiation unit 120B and the fourth radiation unit 130C on the first surface 112.

In this embodiment, a shape of the first radiation unit 120B and a shape of the orthogonal projection of the third radiation unit 130B on the first surface 112 are line-symmetrical patterns with a boundary line L10 therebetween as a line of symmetry. In this embodiment, the shape of the first radiation unit 120B is not completely line-symmetrical with the shape of the third radiation unit 130B because the first radiation unit 120B has a notch in the middle portion, it is substantially line-symmetrical. This notch is used to adjust the effect of impedance matching. The impedance characteristic may be adjusted by adjusting the shape and size of the notch and the projected areas of the notch and the second feeder unit 130A. The overall bandwidth and radiation characteristics of the light-transmitting antenna 100 are thus further adjusted. In this embodiment, a shape of the second radiation unit 120C and a shape of the orthogonal projection of the fourth radiation unit 130C on the first surface 112 are line-symmetrical patterns with the boundary line L10 therebetween as a line of symmetry. Similarly, the shape of the second radiation unit 120C and the shape of the fourth radiation unit 130C do not need to be completely line-symmetrical, and may only be substantially line-symmetrical. In addition, in this embodiment, the shape of the first radiation unit 120B is not exactly the same as the shape of the second radiation unit 120C, but the disclosure is not limited thereto.

The following data are obtained after the measurement is performed with the light-transmitting antenna 100 shown in FIGS. 1 and 2. Herein, the dimensions of the three substrates are all 100 mm×100 mm, the thickness of the conductive pattern is 0.7 mm, and the distance between the conductive reflecting plate 140 and the substrate 110 is 3 cm. The light-transmitting antenna 100 has wide beam (≥50°) characteristics in three frequency bands of 1.8 GHz: 109°, 2.1 GHz: 190°, and 3.5 GHz: 151°. Besides, the front-back ratios of the light-transmitting antenna 100 at 1.8 GHz, 2.1 GHz, and 3.5 GHz are −7.5 dB, −16.4 dB, and −7.7 dB, respectively. The return losses of the light-transmitting antenna 100 at 1.8 GHz, 2.1 GHz, and 3.5 GHz are −7.38 dB, −10.0 dB, and −11.84 dB, respectively. The peak gains of the light-transmitting antenna 100 at 1.8 GHz, 2.1 GHz, and 3.5 GHz are 2.78 dB, 4.03 dB, and 4.14 dB, respectively. From these results, it can be seen that this light-transmitting antenna 100 has more than one frequency band, has a high peak gain (≥1.0), has a wide beam (≥50°), and is different from general antennas in that it is more light-transmitting.

Figure 3:
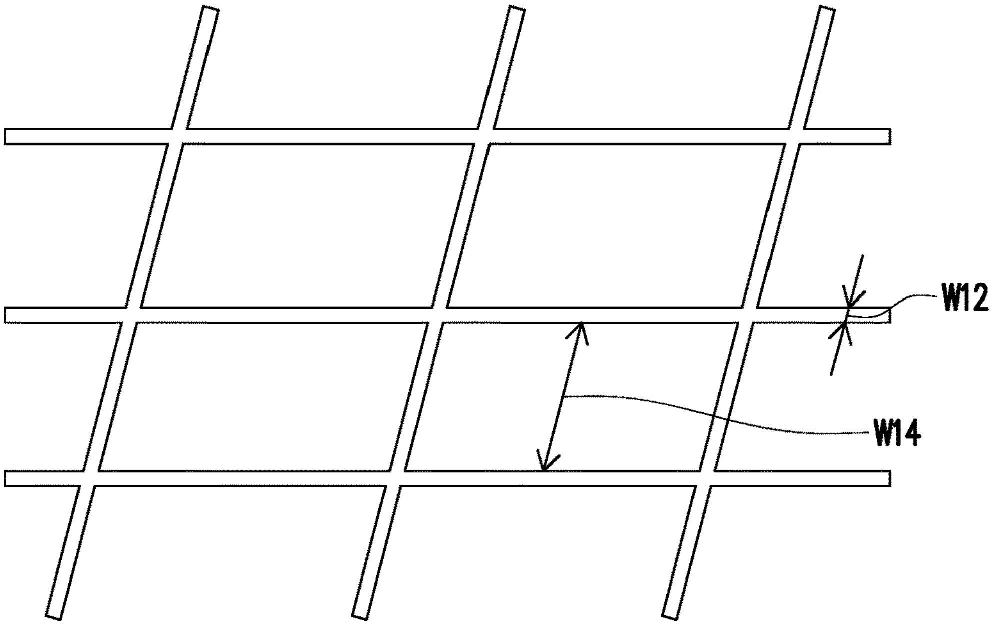
FIG. 3 is a schematic local view of a first conductive pattern of the light-transmitting antenna of FIG. 1.

FIG. 3 is a schematic local view of a first conductive pattern of the light-transmitting antenna of FIG. 1. With reference to FIG. 1 and FIG. 3, in this embodiment, the first conductive pattern 120 and the second conductive pattern 130 are mesh metal. That is, in the range of the first conductive pattern 120 and the second conductive pattern 130 shown in FIG. 1, it can be seen that they are formed of mesh metal in an enlarged state. Therefore, light can pass through the mesh of the mesh metal, so that the first conductive patterns 120 and the second conductive patterns 130 can transmit light. In this embodiment, the mesh metal has a line width W12 and a mesh width W14. In consideration of light transmittance, the line width W12 is, for example, between 0.05 times and 0.1 times the mesh width W14. Further, if feasible in the manufacturing process, the mesh of the first conductive pattern 120 and the mesh of the second conductive pattern 130 can be completely overlapped as much as possible to improve the light transmittance. In addition, the conductive zone 142 on the conductive reflecting plate 140 may also be mesh metal in this embodiment, and the mesh metal has a line width W12 and a mesh width W14. The mesh may be the same as or different from the mesh of the first conductive pattern 120 and the mesh of the second conductive pattern 130. In this embodiment, a larger mesh width W14 can be selected, but the size of the mesh width is less than 1/10 times the operating wavelength to improve light transmittance. The light transmittance may also be improved by adjusting the mesh of the conductive zone 142 on the conductive reflecting plate 140 to overlap with the mesh of the first conductive pattern 120 and the mesh of the second conductive pattern 130 as much as possible.

Figure 4:
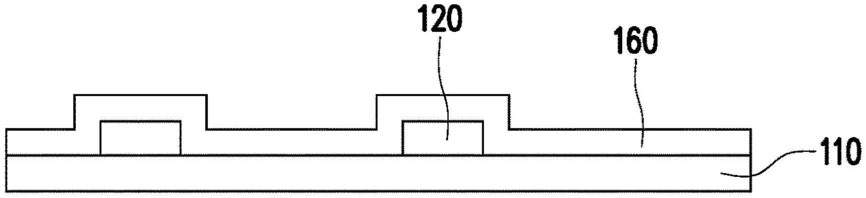
FIG. 4 is a schematic local cross-sectional view of the first conductive pattern of the light-transmitting antenna of FIG. 1.

FIG. 4 is a schematic local cross-sectional view of the first conductive pattern of the light-transmitting antenna 100 of FIG. 1. With reference to FIG. 4, in this embodiment, the light-transmitting antenna 100 further includes a transparent film 160 covering the first conductive pattern 120 and the second conductive pattern 130. The transparent film 160 may protect the first conductive pattern 120 and the second conductive pattern 130, including anti-oxidation and damage prevention. In addition, by properly selecting the material of the transparent film 160, the function of refractive index matching is achieved, and the light transmittance of the light-transmitting antenna 100 may be improved. Further, by properly selecting the material of the transparent film 160, for example, selecting a material featuring conductivity, this conductive transparent film 160 can also be used to reduce the overall impedance of the first conductive pattern 120 and the second conductive pattern 130, and the efficiency of signal transmission is thereby improved. Since the transparent film 160 has conductivity, the transparent film 160 does not cover the entire first surface 112 and the second surface 114. The region covered by the transparent film 160 is approximately equal to the region where the first conductive pattern 120 is distributed and the region where the second conductive pattern 130 is distributed, so as to prevent the appearances of the radiation units from being changed to affect the transmission and reception of signals.

Figure 5:
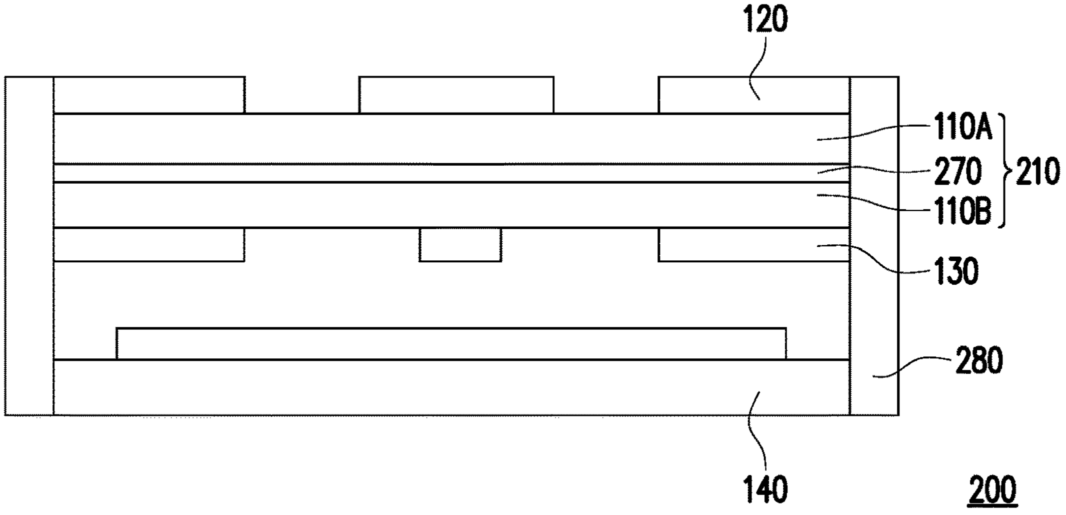
FIG. 5 is a schematic three-dimensional view of a light-transmitting antenna according to another embodiment of the disclosure.

FIG. 5 is a schematic three-dimensional view of a light-transmitting antenna according to another embodiment of the disclosure. In FIG. 5, the dimensions and proportions of the elements are not actual dimensions and proportions. With reference to FIG. 5, a light-transmitting antenna 200 of this embodiment is substantially the same as the light-transmitting antenna 100 of FIG. 1, and only the differences therebetween are described herein. A substrate 210 further includes an optical adhesive layer 270 disposed between the first substrate 110A and the second substrate 110B. The optical adhesive layer 270 may improve the alignment accuracy of the first conductive pattern 120 and the second conductive pattern 130. Further, by selecting a material having an appropriate refractive index to act as the optical adhesive layer 270, the light transmittance of the substrate 210 may also be improved. The light-transmitting antenna 200 of this embodiment may further include an outer frame 280 for fixing the conductive reflecting plate 140, the first substrate 110A, and the second substrate 110B.

Figure 6:
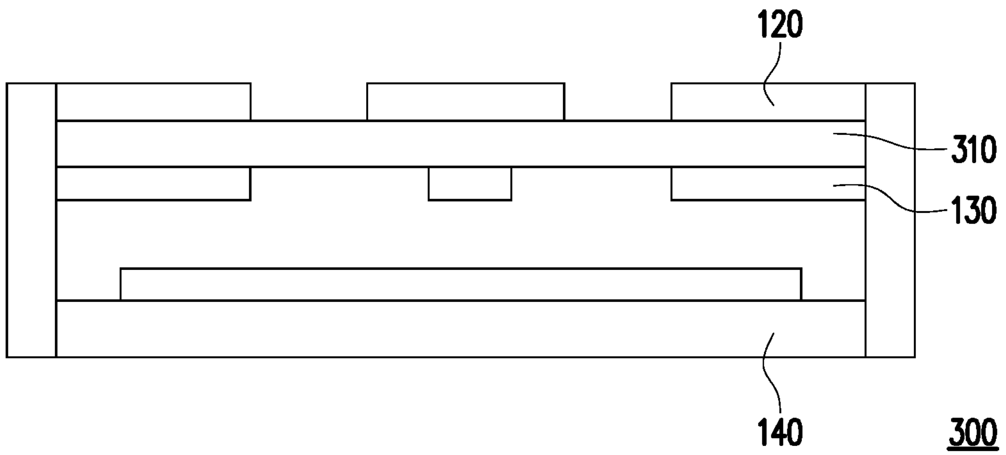
FIG. 6 is a schematic three-dimensional view of a light-transmitting antenna according to still another embodiment of the disclosure.

FIG. 6 is a schematic three-dimensional view of a light-transmitting antenna according to still another embodiment of the disclosure. In FIG. 6, the dimensions and proportions of the elements are also not actual dimensions and proportions. With reference to FIG. 6, a light-transmitting antenna 300 of this embodiment is substantially the same as the light-transmitting antenna 100 of FIG. 1, except that a substrate 310 in this embodiment is a single substrate, rather than a combination of two or more substrates. Therefore, the light-transmitting antenna 300 provides a better light transmittance.

In view of the foregoing, the light-transmitting antenna of the disclosure has the characteristics of broadband, high gain, and multiple frequencies. The type of radiating units of the disclosure provide multiple couplings for the antenna radiation, making the antenna have multi-frequency characteristics. The transparent and capacitively coupled feeder lines not only keep the impedance matching quality intact, but also the interference problem is solved, and the aesthetics is improved. The conductive patterns with full flat design make a lower manufacturing cost. When the conductive reflecting plate is used, the beam width and directivity of the antenna may be increased, the back interference may be addressed, and the coverage of indoor signals may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A transparent antenna, comprising:

a substrate having a first surface and a second surface opposite to each other;

a first conductive pattern disposed on the first surface and having a first feeder unit, a first radiation unit, a second radiation unit, and a first connection unit, wherein the first feeder unit and the first connection unit are connected to two opposite sides of the first radiation unit, and two ends of the first connection unit connect the first radiation unit and the second radiation unit;

a second conductive pattern disposed on the second surface and having a second feeder unit, a third radiation unit, a fourth radiation unit, and a second connection unit, wherein the second feeder unit and the second connection unit are connected to two opposite sides of the third radiation unit, two ends of the second connection unit connect the third radiation unit and the fourth radiation unit, an orthogonal projection of the second feeder unit on the first surface at least partially overlaps the first feeder unit, and the first conductive pattern and the second conductive pattern are mesh metal; and a conductive reflecting plate stacked on the substrate at a distance, wherein the conductive reflecting plate has a conductive zone, orthogonal projections of the first radiation unit, the first connection unit, the third radiation unit, and the second connection unit on the conductive reflecting plate all fall on the conductive zone, and orthogonal projections of the second radiation unit and the fourth radiation unit on the conductive reflecting plate partially fall on the conductive zone.

2. The transparent antenna according to claim 1, wherein the transparent antenna has an operating wavelength, and a distance between the conductive reflecting plate and the substrate is between 0.05 times to 1.5 times the operating wavelength.

3. The transparent antenna according to claim 1, wherein the substrate has no conductive through holes.

4. The transparent antenna according to claim 1, further comprising a feeder line, wherein the first feeder unit and the second feeder unit are electrically connected to the feeder line at an edge of the substrate.

5. The transparent antenna according to claim 1, wherein orthogonal projections of the first radiation unit and the third radiation unit on the first surface are located between orthogonal projections of the second radiation unit and the fourth radiation unit on the first surface.

6. The transparent antenna according to claim 1, wherein the first radiation unit, the second radiation unit, the third radiation unit, and the fourth radiation unit are trapezoidal.

7. The transparent antenna according to claim 1, wherein the substrate comprises a first substrate and a second substrate that are stacked on each other, a surface of the first substrate facing away from the second substrate is the first surface, and a surface of the second substrate facing away from the first substrate is the second surface.

8. The transparent antenna according to claim 7, wherein the substrate further comprises an optical adhesive layer disposed between the first substrate and the second substrate.

9. The transparent antenna according to claim 1, wherein a shape of the first radiation unit and a shape of an orthogonal projection of the third radiation unit on the first surface are line-symmetrical patterns with a boundary line therebetween as a line of symmetry.

10. The transparent antenna according to claim 1, wherein a shape of the second radiation unit and a shape of an orthogonal projection of the fourth radiation unit on the first surface are line-symmetrical patterns with a boundary line therebetween as a line of symmetry.

11. The transparent antenna according to claim 1, further comprising a transparent film covering the first conductive pattern and the second conductive pattern.

12. The transparent antenna according to claim 11, wherein the transparent film covering has a conductivity.

13. The transparent antenna according to claim 1, wherein the mesh metal has a line width and a mesh width, and the line width is between 0.05 times and 0.1 times the mesh width.

* * * * *